(12) United States Patent
Herbst et al.

(10) Patent No.: US 7,237,473 B2
(45) Date of Patent: Jul. 3, 2007

(54) ACTUATOR FOR PNEUMATIC VALVE

(75) Inventors: Robert J. Herbst, Avon, OH (US); Travis Ramler, Elyria, OH (US)

(73) Assignee: Bendix Commercial Vehicle Systems, Elyria, OH (US)

( * ) Notice: Subject to any disclaimer, the term of this patent is extended or adjusted under 35 U.S.C. 154(b) by 41 days.

(21) Appl. No.: 11/186,276

(22) Filed: Jul. 21, 2005

(65) Prior Publication Data

US 2007/0017362 A1    Jan. 25, 2007

(51) Int. Cl.
F15B 11/08    (2006.01)
F16K 31/44    (2006.01)

(52) U.S. Cl. .......................................... 91/461; 92/31

(58) Field of Classification Search ................ 91/461; 92/31; 74/55; 251/252
See application file for complete search history.

(56) References Cited

U.S. PATENT DOCUMENTS 2,087,356 A * 7/1937 Parker ............................ 74/44
2,620,813 A * 12/1952 Bloomfield ................... 137/38
3,260,131 A * 7/1966 Miles ........................... 74/608
3,550,903 A    12/1970 Hauser
5,398,725 A * 3/1995 Nakazawa et al. ....... 137/636.1
6,701,709 B2    3/2004 Isaac, Jr. et al.

FOREIGN PATENT DOCUMENTS

| DE | 1023940 | 2/1958 |
|----|---------|--------|
| EP | 003687 | 8/1979 |
| EP | 214 373 | 3/1987 |
| EP | 247347 | 12/1987 |
| WO | WO 89/11054 | 11/1989 |

OTHER PUBLICATIONS

Bendix Service Data brochure, SD-03-824, Bendix TC-7 Trailer Control Brake Valve, 4 pgs., Mar. 2004, printed USA.
International Search Report and Written Opinion from PCT/US2006/021719 dated Oct. 10, 2006.

* cited by examiner

*Primary Examiner*—Igor Kershteyn
(74) *Attorney, Agent, or Firm*—Calfee, Halter & Griswold, LLP

(57) ABSTRACT

A pneumatic valve includes a housing having an inlet port and a delivery port and an exhaust port. A valve element is movable in the housing to control air flow between the inlet port and the delivery port and the exhaust port. The valve includes a rolling element actuator for converting a rotary actuation force to linear movement of the valve element.

17 Claims, 2 Drawing Sheets

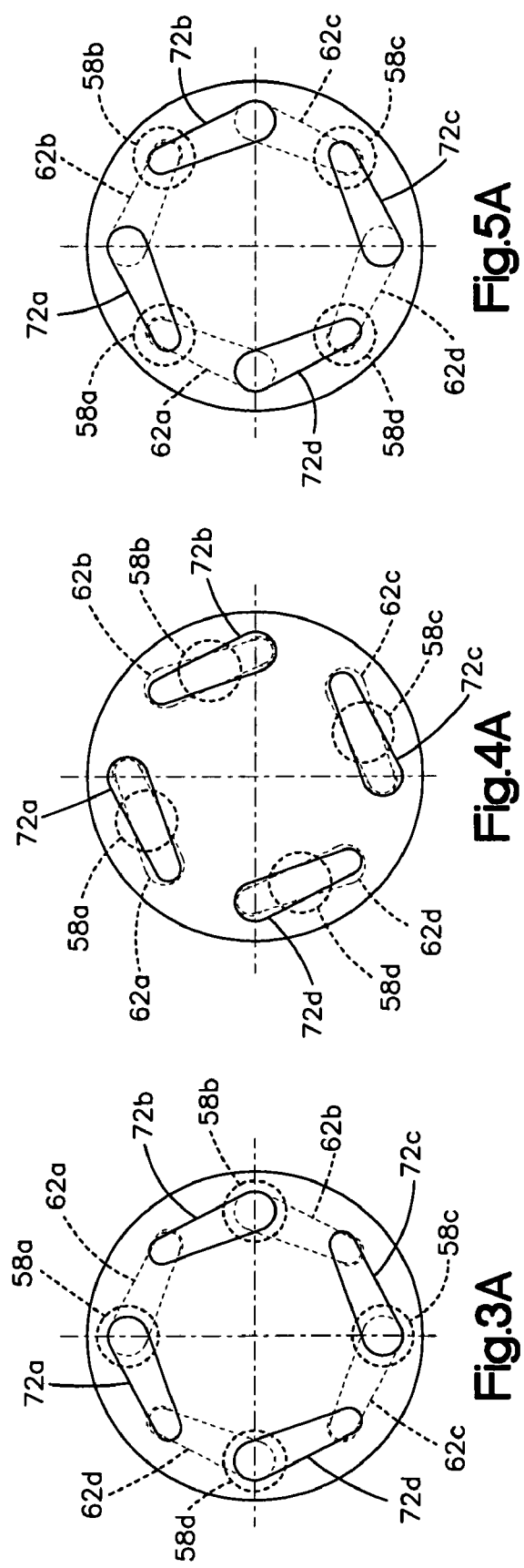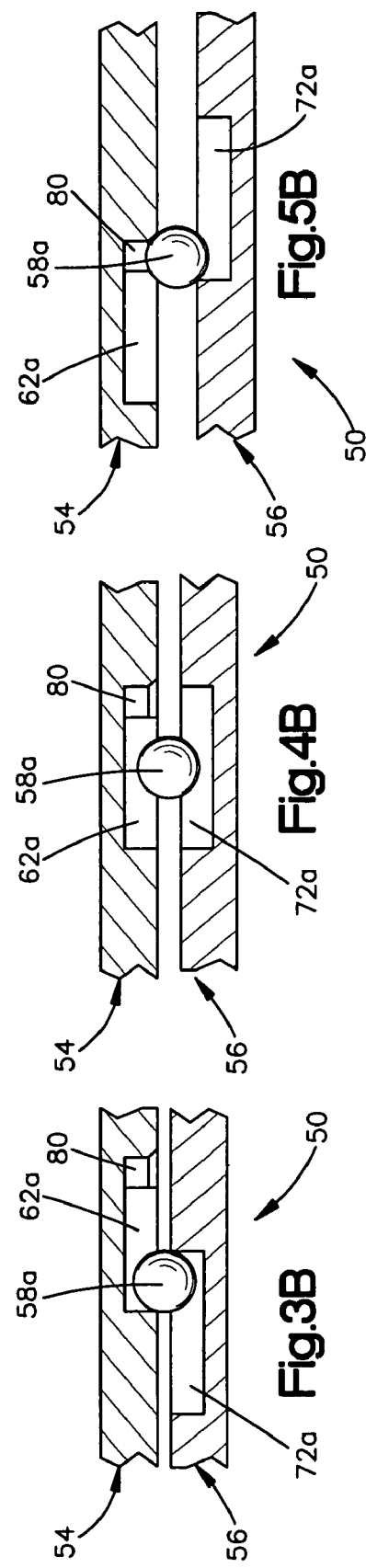

ACTUATOR FOR PNEUMATIC VALVE

TECHNICAL FIELD

This application relates to a pneumatic valve and, in particular, to a pneumatic valve, such as a trailer control valve, that may be used in a vehicle air braking system, and to an actuator for such a valve.

BACKGROUND OF THE INVENTION

Many heavy vehicles, such as tractor-trailer combinations, use air braking systems. Air under pressure is selectively directed to the vehicle brakes, including the trailer brakes, to slow and stop the vehicle. The air pressure is provided by a compressor and one or more reservoirs on the tractor. Supply air and service air (control pressure air) are directed over two lines from the tractor to the trailer. The control pressure air controls operation of the service relay valve on the trailer, which in turn directs supply air to the trailer brakes as needed.

The service control pressure for the trailer brakes is normally set by the vehicle brake pedal, which also simultaneously controls the tractor brakes. In addition, many vehicles have a manually operated trailer control brake valve, also known as a trailer control valve, that is operable to selectively apply the brakes of only the trailer. The trailer control valve may be a hand operated push-type valve, or may be a hand operated valve responsive to rotary force, for example, turning a handle. This latter type of valve is exemplified by the TC-7™ trailer control brake valve of Bendix Commercial Vehicle Systems LLC. This particular valve has a ramped cam and cam follower that engage each other to translate rotary motion of the handle into linear motion of a valve element, thereby to control, in a graduated manner, service control pressure to the trailer brakes.

SUMMARY OF THE INVENTION

In one aspect the invention relates to a pneumatic valve comprising a housing having an inlet port and a delivery port and an exhaust port. A valve element is movable in the housing to control fluid flow between the inlet port and the delivery port and the exhaust port. The valve includes a rolling element actuator for converting a rotary actuation force of the valve to linear movement of the valve element.

In another aspect the invention relates to a vehicle air braking system comprising a source of supply air under pressure for operating a trailer brake; a source of service air under pressure for controlling operation of a service relay valve that controls the operation of the trailer brake; and a trailer control valve for controlling the flow of service air, the valve including a linearly movable valve element, the valve also including a rolling element actuator for converting a rotary actuation force of the valve to linear movement of the valve element.

In another aspect the invention relates to a method of actuating a pneumatic control valve, including the steps of:
  providing a rotary actuation force to the valve;
  rotating a cam about an axis of the valve in response to the rotary actuation force;
  causing a plurality of rolling elements to orbit about the axis and to move in a direction parallel to the axis in response to rotation of the cam about the axis;
  moving a follower in a direction along the axis in response to the orbital and axial movement of the rolling elements; and transmitting axially directed force from the follower to a movable valve element thereby to actuate the valve.

In another aspect the invention relates to a pneumatic valve comprising a housing having an inlet port and a delivery port and an exhaust port. A handle is supported on the housing for rotational movement relative to the housing. A valve element is movable in the housing to control flow of air between the inlet port and the delivery port and the exhaust port. The valve includes means for moving the valve element linearly in response to rotational movement of the handle, comprising a plurality of rolling elements.

BRIEF DESCRIPTION OF THE DRAWINGS

Further features of the invention will be apparent to one of ordinary skill in the art to which the invention pertains, from a reading of the following description in conjunction with the attached drawings, in which:

FIGS. 3-5 are schematic views illustrating operation of an actuator that forms part of the valve of FIG. 1

DETAILED DESCRIPTION OF AN EMBODIMENT

Figure 1:
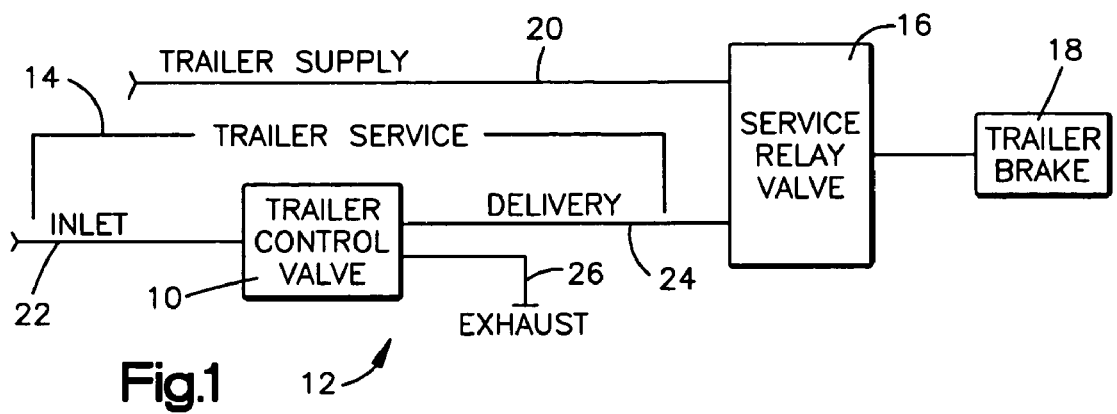
FIG. 1 is a schematic diagram of a portion of a vehicle braking system including a valve in accordance with the invention.

This invention relates to a pneumatic valve and, in particular, to a pneumatic valve, such as a trailer control valve, that may be used in a vehicle air braking system, and to an actuator for such a valve. The invention is applicable to valves and actuators of varying different constructions. As representative of the invention, FIG. 1 illustrates schematically a valve 10 in accordance with one embodiment of the present invention. The invention is usable in other types of vehicle braking systems, and in other types of pneumatic systems.

The system 12 includes a trailer supply line 20 for supplying air under pressure to a service relay valve 16 of a trailer and thence forth to a trailer brake 18. The system 12 also includes a trailer service line 14 for supplying control pressure to the service relay valve 16. The valve 10 is a trailer control valve located in the service line 14 and has an inlet 22 for receiving pressure, a delivery 24 for delivering control pressure to the service relay valve 16, and an exhaust 26.

Figure 2:
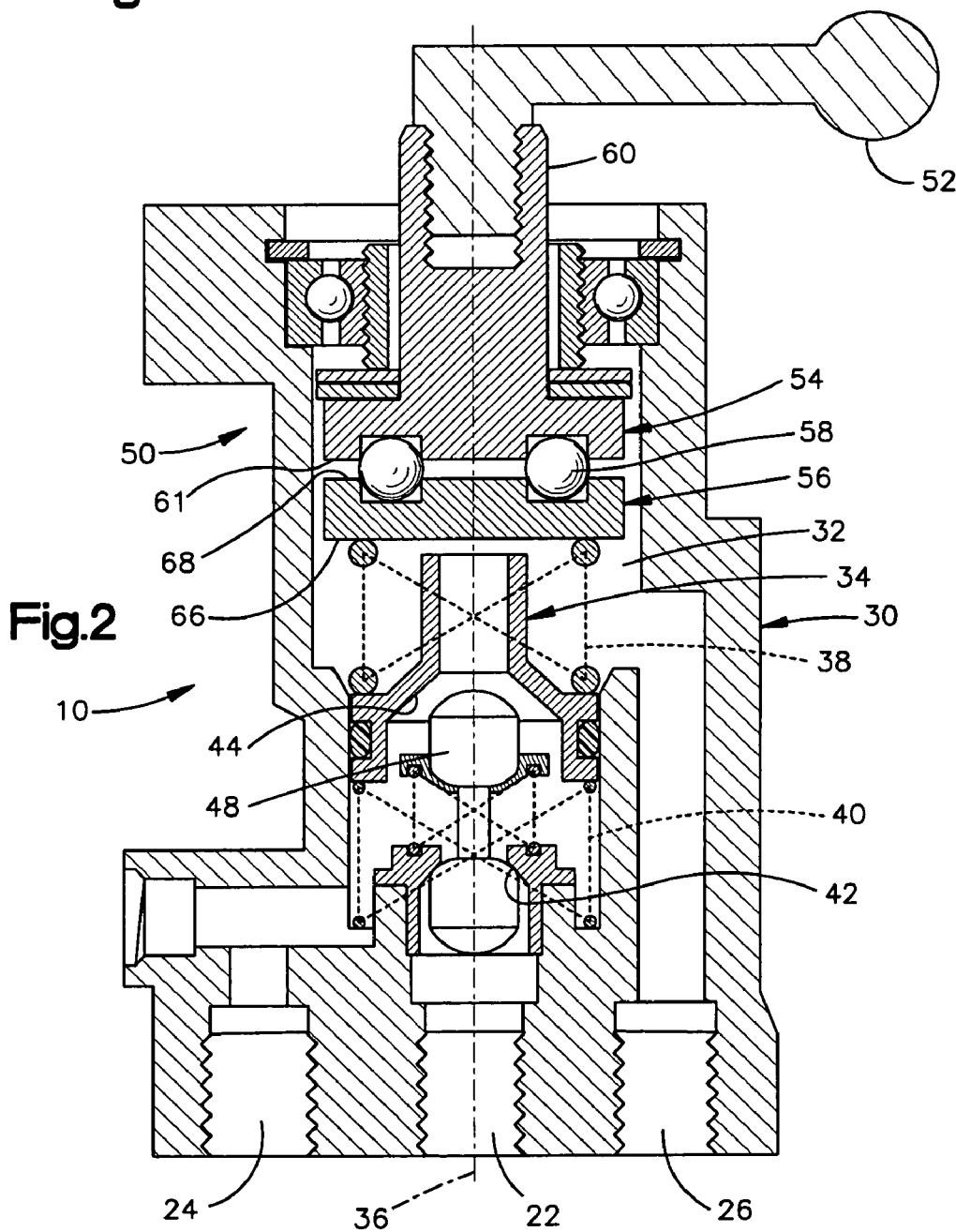
FIG. 2 is a longitudinal or axial sectional view of the valve of FIG. 1, shown in an unactuated position.

The valve 10 is shown in more detail in FIG. 2. The valve 10 illustrated in FIG. 2 is only representative of the different types of valves that can incorporate the invention.

The valve 10 includes a housing 30 that can be made from metal or from plastic for lighter weight. The housing 30 has a chamber 32 in which a piston 34 is supported for sliding movement in a direction along an axis 36 of the valve 10. A graduation spring 38 is in engagement with one end of the piston 34 and a return spring 40 is in engagement with the other end of the piston, to position the piston axially in the chamber 32.

The inlet 22, the delivery 24, and the exhaust 26 are connected in fluid communication with the chamber 32. An inlet seat 42 is formed on an insert in the housing 30, and an exhaust seat 44 is formed on the piston 34. The inlet seat 42 could, alternatively, be formed integrally with the housing 30.

A movable valve element 48 is supported in the housing 30, adjacent the inlet seat 42 and the exhaust seat 44, for sliding movement in a direction along (parallel to) the axis 36. The valve 10 includes an actuator 50 as described below in detail, for moving the movable valve element 48.

When the parts of the valve 10 are in the position shown in FIG. 2, the valve element 48 is spaced apart from the exhaust seat 44. The delivery port 24 is open to exhaust 26, and the supply port 22 is closed off.

Should the valve 10 be actuated, in a manner as described below, the piston 34 moves toward the valve element 48 until the exhaust seat 44 closes against the valve element. Additional movement of the piston 34 causes the valve element 48 to move away from the inlet seat 42, opening a path for air to flow from the supply port 22 to the delivery port 24. Thus, the valve 10 provides a graduated application of control pressure in the service line 14, to the service relay valve 16 of the trailer.

The actuator 50 is responsive to rotary movement of a handle 52 relative to the housing 30. The actuator 50 includes a cam 54, a follower 56, and one or more rolling elements 58 interposed between the cam and the follower. The illustrated embodiment includes two rolling elements 58.

The cam 54 is supported in the housing 30 for rotation about the axis 36, without substantial axial movement. The cam 54 has a portion 60 adapted for connection with the handle 52, so that rotation of the handle about the axis 36 causes rotation of the cam about the axis. The cam 54 has a generally disc-shaped configuration including an inner major side surface 61.

A plurality of generally kidney-shaped grooves or ramps 62a-62d ("62") are formed on the inner major side surface 61 of the cam 54. The number of grooves or ramps is the same as the number of rolling elements 58 in the actuator 50. Each groove 62 extends in an arcuate configuration about the axis 36 and has a narrow or shallower end and a wide or deeper end. In the illustrated embodiment, four grooves 62a-62d are provided in the cam 54, at ninety degrees apart from each other, with the narrow end of one groove 62 adjacent the wide end of the next groove. The "grooves" could alternatively be slits, or openings through the material of the cam.

The follower 56 is supported in the housing 30 for translational movement, that is, movement in the direction of (parallel to) the axis 36, without substantial rotational movement. The follower 56 has a generally disc-shaped configuration including an inner major side surface 66 and an outer major side surface 68. The inner major side surface 66 is in engagement with the graduation spring 38. The graduation spring 38 is compressed between the follower 56 and the piston 34.

A plurality of grooves or ramps 72a-72d ("72") are formed on the outer major side surface 68 of the follower 56, facing the cam 54. The number of grooves or ramps 72 is the same as the number of rolling elements 58 in the actuator 50. Each groove 72 extends in an arcuate configuration about the axis 36 and has a narrow or shallower end and a wide or deeper end. In the illustrated embodiment, four grooves 72 are provided, at ninety degrees apart from each other, with the narrow end of one groove adjacent the wide end of the next groove. The grooves 72 in the follower 56 are oriented (end to end) oppositely to the grooves 62 in the cam 54.

The rolling elements 58 in the illustrated embodiment are balls. In other embodiments the rolling elements 58 could be other devices. The balls 58 are equal in number to the grooves 62 on the cam 54 and to the grooves 72 on the follower 56 and thus are labeled 58a-58d herein. The balls 58a-58d are captured between the grooves 62 on the cam 54 and the grooves 72 on the follower 56, so that each one of the balls is associated with a respective pair of grooves, one in the cam and one in the follower. The rolling elements could be textured, for example by sandblasting, to increase rolling friction.

FIG. 2 illustrates the parts of the valve 10 in an unactuated condition. The handle 52 is in a first position of rotation relative to the housing 30. The balls 58 are in the deeper ends of the grooves 62 of the cam 54 and are also in the deeper ends of the grooves 72 of the follower 56. As a result, the outer side surface 68 of the follower 56 is relatively close to the inner side surface 61 of the cam 54. The follower 56 is relatively far from the piston 34. The movable valve element 48 is spaced apart from the exhaust seat 44. The delivery port 24 is open to exhaust 26, and the supply port 22 is closed off.

The valve 10 is actuated by turning the handle 52 about the axis 36 relative to the housing 30. Because the cam 54 is connected for movement with the handle 52, the cam rotates about the axis 36.

FIGS. 3-5 illustrate several positions of movement of the cam 54 and the follower 56. In FIG. 3, the cam 54 and the follower 56 are in a starting position with the valve 10 being unactuated. FIG. 4 shows the cam 54 as having rotated 45 degrees (with the balls 58 having moved 22.5 degrees), and FIG. 5 shows the cam 54 as having rotated 90 degrees (with the balls 58 having moved 45 degrees).

As the cam 54 rotates, the grooves 62 on the cam orbit about the axis 36. The grooves 62 move relative to the balls 58, so that the shallower ends of the cam grooves approach the balls. The balls 58 as a result are rolled along the grooves 62, and are simultaneously pushed axially away from the handle 52, in a direction toward the piston 34. The axial movement of the balls 58 results in axial movement of the follower 56, in a direction toward the piston 34.

At the same time, the balls 58 roll along the grooves 72 in the follower 56, thus moving from the deeper ends of those grooves to the shallower ends. This increases the resultant axial movement of the follower 56, away from the cam 54 and toward the piston 34. The axial movement of the follower 56 causes the piston 34 to move and thereby actuate the valve 10.

A detent can be provided for maintaining the valve 10 in the open position. As one example, one or more of the grooves 62 or 72 in either the cam 54 or the follower 56 can have detents at its narrow end, as shown schematically at 80 in FIG. 3B-4B-5B, to cause the actuator 50 to hold the valve 10 in the fully open condition.

In other embodiments, the valve can be hydraulically actuated, rather than manually actuated. A different number of balls can be used, and rolling elements other than balls can be used. Cam ramps can be used in place of the grooves, in the cam and/or in the follower.

The roller/cam actuator 50 can be more compact than a traditional cam and follower configuration, thus enabling a smaller and lighter weight valve. The rolling movement of the balls helps to provide a relatively low friction actuator, as compared to the sliding movement inherent in some traditional cam/follower actuators.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A pneumatic valve comprising:
a housing having an inlet port and an exhaust port and a delivery port;
a valve element movable in the housing to control air flow between the inlet port and the delivery port and the exhaust port; and
a rolling element actuator for converting a rotary actuation force to linear movement of the valve element;
wherein the actuator includes a cam, a follower, and at least one rolling element interposed between the cam and the follower;
the cam being rotatable about an axis without substantial movement along the axis, in response to rotary actuation force;
the at least one rolling element transmitting force from the cam to the follower; and
the follower being movable along the axis without substantial rotation along the axis, in response to force transmitted from the cam through the at least one rolling element;
wherein the actuator includes a plurality of rolling elements that are engaged in respective grooves in the cam and the follower and that orbit about the axis and move in a direction parallel to the axis upon rotation of the cam about the axis, thereby to effect movement of the follower along the axis.

2. A valve as set forth in claim 1 wherein the actuator includes a cam, a follower, and a plurality of balls interposed between the cam and the follower;
the cam being rotatable about an axis without substantial movement along the axis, in response to rotary actuation force of the valve, the cam having a plurality of grooves in which the balls engage;
the follower having a plurality of grooves in which the balls engage, the follower being movable along the axis without substantial rotation along the axis, in response to force transmitted from the cam through the ball;
the balls orbiting about the axis and moving in a direction parallel to the axis upon rotation of the cam about the axis;
the axial movement of the follower causing a piston to move the valve element away from the inlet seat thereby to direct air under pressure out of the valve through the delivery port of the valve.

3. A valve as set forth in claim 1 comprising a detent for maintaining the valve element in a selected position.

4. A vehicle air braking system comprising:
a source of supply air under pressure for operating a trailer brake;
a source of service air under pressure for controlling operation of a service relay valve that controls the operation of the trailer brake; and
a trailer control valve for controlling the flow of service air, the valve including a linearly movable valve element, the valve also including a rolling element actuator for converting a rotary actuation force to linear movement of the valve element.

5. A system as set forth in claim 4 wherein the valve actuator includes a cam, a follower, and at least one rolling element interposed between the cam and the follower;
the cam being rotatable about an axis without substantial movement along the axis, in response to rotary actuation force of the valve;
the at least one rolling element transmitting force from the cam to the follower; and
the follower being movable along the axis without substantial rotation along the axis, in response to force transmitted from the cam through the at least one rolling element.

6. A system as set forth in claim 5 wherein the at least one rolling element comprises at least two balls.

7. A system as set forth in claim 6 wherein the actuator includes a plurality of rolling elements that are engaged in respective grooves in the cam and the follower and that orbit about the axis and move in a direction parallel to the axis upon rotation of the cam about the axis, thereby to effect movement of the follower along the axis.

8. A system as set forth in claim 4 wherein the actuator includes a cam, a follower, and a plurality of balls interposed between the cam and the follower;
the cam being rotatable about an axis without substantial movement along the axis, in response to rotary actuation force, the cam having a plurality of grooves in which the balls engage;
the follower having a plurality of grooves in which the balls engage, the follower being movable along the axis without substantial rotation along the axis, in response to force transmitted from the cam through the ball;
the balls orbiting about the axis and moving in a direction parallel to the axis upon rotation of the cam about the axis;
the axial movement of the follower causing a piston to move the valve element away from the inlet seat thereby to direct air under pressure out of the valve through the delivery port of the valve.

9. A method of actuating a pneumatic control valve, including the steps of:
providing a rotary actuation force;
rotating a cam about an axis of the valve in response to the rotary actuation force;
causing a plurality of rolling elements to orbit about the axis and to move in a direction parallel to the axis in response to rotation of the cam about the axis;
moving a follower in a direction along the axis in response to the orbital and axial movement of the rolling elements; and
transmitting axially directed force from the follower to a movable valve element thereby to actuate the valve.

10. A method as set forth in claim 9 wherein the step of causing a plurality of rolling elements to orbit about the axis and to move in a direction parallel to the axis in response to rotation of the cam about the axis, comprises causing the rolling elements to roll along the cam and along the follower as they orbit about the axis.

11. A pneumatic valve comprising:
a housing having an inlet port and a delivery port and an exhaust port;
a handle supported on the housing for rotational movement relative to the housing;
a valve element movable in the housing to control air flow between the inlet port and the delivery port and the exhaust port; and
means for moving the valve element linearly in response to rotational movement of the handle, comprising a plurality of rolling elements.

12. A valve as set forth in claim 11 wherein the means for moving further includes a cam and a follower, the plurality of rolling elements being disposed between the cam and the follower.

13. A valve as set forth in claim 12 wherein the cam has a plurality of grooves, the follower has a plurality of grooves, and the rolling elements are balls disposed in pairs of associated grooves on the cam and the followers.

14. A valve as set forth in claim 13 wherein at least one groove has a detent.

15. A pneumatic valve comprising:
   a housing having an inlet port and an exhaust port and a delivery port;
   a valve element movable in the housing to control air flow between the inlet port and the delivery port and the exhaust port; and
   a rolling element actuator for converting a rotary actuation force about an axis to linear movement of the valve element;
   the actuator including at least one rolling element that is engaged in a groove in one of the cam and the follower and that moves in a direction parallel to the axis upon rotation of the cam about the axis, thereby to effect movement of the follower along the axis.

16. A pneumatic valve as set forth in claim 15 wherein the actuator includes a plurality of rolling elements that includes the at least one rolling element, the plurality of rolling elements being engaged in respective grooves in the cam and the follower and moving in a direction parallel to the axis upon rotation of the cam about the axis, thereby to effect movement of the follower along the axis.

17. A pneumatic valve as set forth in claim 15 wherein the at least one rolling element orbits about the axis and moves in a direction parallel to the axis upon rotation of the cam about the axis, thereby to effect movement of the follower along the axis.

* * * * *